(12) United States Patent
Dong et al.

(10) Patent No.: US 7,853,753 B2
(45) Date of Patent: Dec. 14, 2010

(54) DISTRIBUTIVE NETWORK CONTROL

(75) Inventors: Thomas Z. Dong, Marietta, GA (US);
Dan Spohrer, Alpharetta, GA (US);
Srivijaya Srinivasa, Suwanee, GA (US);
Jamie Richard Williams, Fleet (GB)

(73) Assignee: Verint Americas Inc., Roswell, GA (US)

( * ) Notice: Subject to any disclaimer, the term of this patent is extended or adjusted under 35 U.S.C. 154(b) by 699 days.

(21) Appl. No.: 11/772,440

(22) Filed: Jul. 2, 2007

(65) Prior Publication Data

US 2008/0034163 A1  Feb. 7, 2008

Related U.S. Application Data

(60) Provisional application No. 60/817,818, filed on Jun. 30, 2006.

(51) Int. Cl.
*G06F 12/02* (2006.01)
*G06F 13/00* (2006.01)

(52) U.S. Cl. .................. 711/130; 711/100; 711/118; 711/154

(58) Field of Classification Search .................. 711/100, 711/117, 118, 130, 154; 709/243
See application file for complete search history.

(56) References Cited

U.S. PATENT DOCUMENTS

| | | | |
|---|---|---|---|
| 5,606,686 A * | 2/1997 | Tarui et al. .................. 711/121 |
| 5,835,640 A | 11/1998 | Clements |
| 6,760,812 B1 * | 7/2004 | Degenaro et al. ........... 711/133 |
| 7,373,451 B2 * | 5/2008 | Lam et al. ...................... 711/6 |
| 2002/0004846 A1 * | 1/2002 | Garcia-Luna-Aceves et al. .......................... 709/245 |
| 2004/0030783 A1 | 2/2004 | Hwang |
| 2004/0139326 A1 | 7/2004 | Ootsuka et al. |

* cited by examiner

*Primary Examiner*—Tuan V. Thai
(74) *Attorney, Agent, or Firm*—Lawrence A. Aaronson, P.C.

(57) ABSTRACT

Included are systems and methods for distributive network control. Also embodiment of a method includes receiving an indication related to recording data stored on a local cache and determining whether to remotely store at least a portion of the data. Some embodiments include sending a request for the stored data.

23 Claims, 6 Drawing Sheets

DISTRIBUTIVE NETWORK CONTROL

CROSS REFERENCE

This application claims the benefit of U.S. Provisional Application No. 60/817,818, filed Jun. 30, 2006, which is hereby incorporated by reference in its entirety.

BACKGROUND

In many network configurations there exists a desire to capture data from one or more computing devices within that network. More specifically, many network configurations can include Voice over Internet Protocol (VoIP) communications. In such a configuration, users may communicate via a VoIP telephone, a softphone, and/or other communications devices. While users of the communications devices may send and receive audio data, depending on the particular configuration, the users may also desire to send other types of data in the form of text files, pictures, video files, audio files, etc. Additionally, while the users of communications devices may desire to send and receive the various types of data, the users, system administrators, and others may also desire to record at least a portion of the data being communicated. Additionally, these parties may also desire the ability to record other data presented to a user of a communications and/or computing device.

Additionally, in highly distributed branch networks, telephony connections can be centralized via a small number of "hub" sites or can be distributed to many or all of the "leaf" nodes of the network. The latter approach may be used for high street or retail operations where each location has a few telephone circuits from its local central office terminating on equipment at that site. There is therefore an increasing desire to provide recording systems in communications and/or data networks that are well suited to all the supported topologies. The challenge in recording data in such networks that are distributed across multiple branches is that much of the data traffic carried is entirely local to that branch. The audio packets associated with the communication do not generally leave the branch.

Many existing IP recording solutions can require a recording device to be located at each branch so as to tap into the data at that branch. Where the number of branches is large, this becomes very expensive. When the total number of calls to be recorded is low, such a network configuration can become uneconomic, as the costs of the hardware and related support are spread across only a few recordings per day.

Additionally, using existing IP conferencing/service-observe type solutions in which conference bridges are located at the central site generally requires that the audio data be "tromboned" from the receiving site to the conference bridge and back again. In this approach, two legs of a 3-way conference (caller, agent, and recorder port) will generally be transmitted between the branch site and the central equipment. In addition to using scarce bandwidth over this link, such a configuration can use expensive resources at the central site and can impact the quality of the communication.

SUMMARY

Included are systems and methods for distributive network control. At least one embodiment of a method includes receiving an indication related to recording data stored on a local cache and determining whether to remotely store at least a portion of the data. Some embodiments include sending a request for the stored data.

Also included are embodiments of a computer readable medium for distributive network control. At least one embodiment of a computer readable medium includes first receiving logic configured to receive an indication related to recording data stored on a local cache and first determining logic configured to determine whether to remotely store at least a portion of the data. Some embodiments include sending logic configured to send a request for the stored data.

Other systems, methods, features, and advantages of this disclosure will be or become apparent to one with skill in the art upon examination of the following drawings and detailed description. It is intended that all such additional systems, methods, features, and advantages be included within this description, be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

The present disclosure makes references to a communications network with multiple outlets. Customers generally desire a selective quality system to record data associated with their in-store agents. The agents can use a heavily distributed Intelligent Contact Management (ICM) IP telephony switch, with stations spread over several of a multitude of sites. This disclosure also outlines embodiments of a plug compatible replacement for the voice capture component that can allow an application server to work in an ICM environment.

ICM generally lacks a Service Observation capability, so an alternate voice capture capability is generally desired. In such a topology, port spanning is also generally not available. Because of the lack of a service observation capability, passive-tap recording at each site could be implemented, however such a solution can be very costly. The service observation capability can also be simulated by an on-demand targeted capture of a single IP telephone station. The result can be delivered as one or more data files to a server such as an application server.

In many network environments, a computer is associated with many of the telephones at a branch office. The computer hardware can be separate from the telephone hardware, however this is not a requirement. More specifically, in an exemplary embodiment, the computer can include telecommunications capabilities and act as a telephone without additional hardware. Other configurations can include telecommunications hardware that is distinct from the computing device 104. In such a configuration, the computer and telephone hardware may be communicatively coupled, however this is not a requirement. Regardless of the configuration, there is generally a computing device (or computing logic) associated with a telephone (or telecommunications logic) in many communications networks. Indeed, in an increasing number of scenarios, the "telephone" includes a software application residing on a computing device (a "softphone") rather than a physical device in its own right.

In many cases, the computing device being used proximate to a Voice over Internet Protocol (VoIP) telephone is already, or can be connected to receive audio packets sent to and from the telephone. The computing device can therefore be used to record audio and/or other data from that telephone. Additionally, other data output from the computing device 104 can also be recorded. By installing a recording application on the computing device 104 alongside the VoIP phone, recordings can be made from that phone and/or from the computing device 104. The recordings can then be transmitted to a central site immediately or buffered locally and sent at a time of reduced network traffic.

Figure 1:
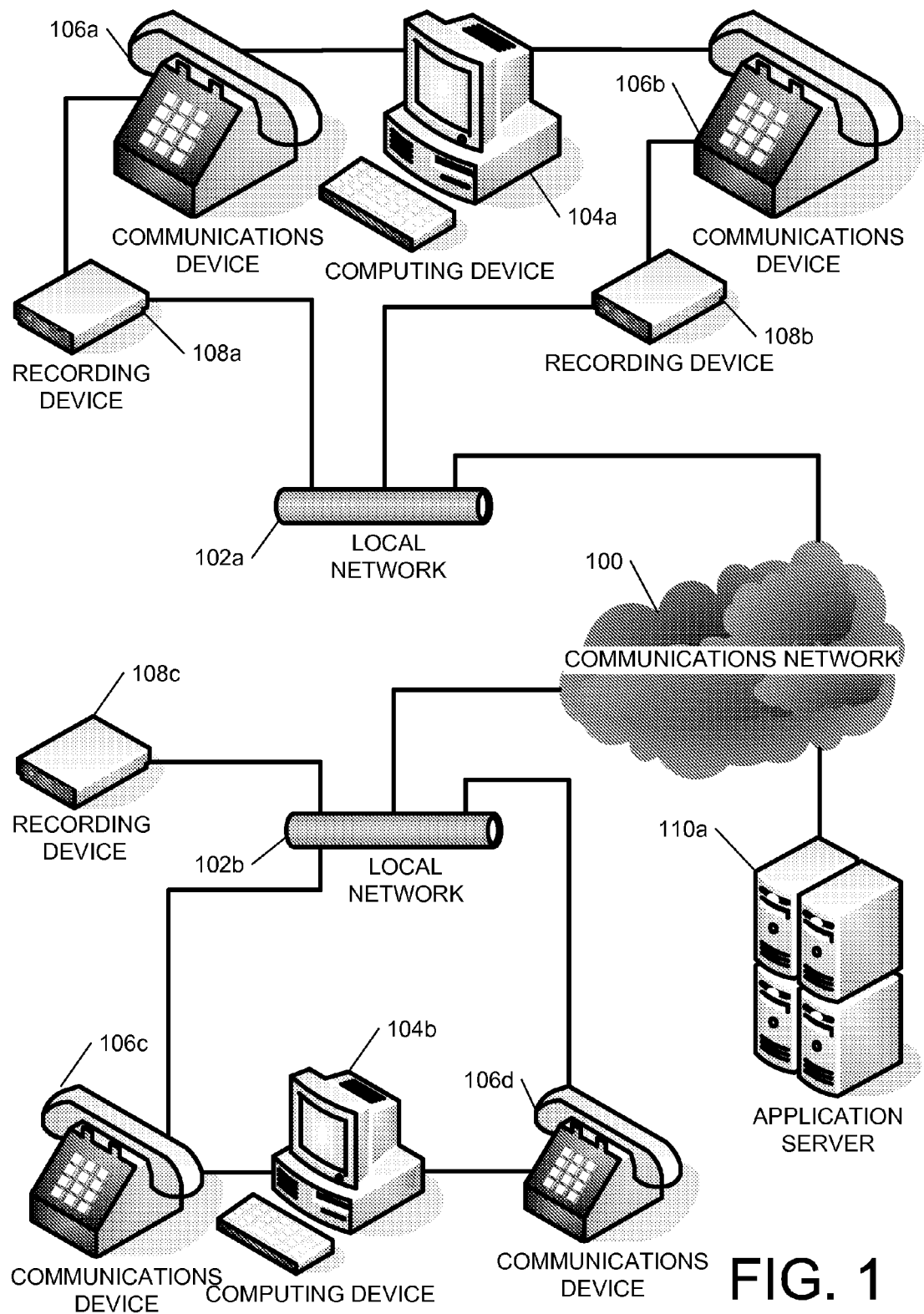
FIG. 1 is a functional diagram illustrating an exemplary configuration of a communications network.

FIG. 1 is a functional diagram illustrating an exemplary configuration of a communications network. In this exemplary embodiment, communications devices 106a and 106b are coupled to computing device 104a. Additionally, communications device 106a is coupled to local network 102a via recording device 108a. Similarly, communications device 106b is coupled to local network 102a via recording device 108b. Local network 102a is coupled to communications network 100.

Similarly, communications device 106c, as well as communications device 106d, are coupled to computing device 104b. Communications device 106c is also coupled to local network 102b via recording device 108c. Communications device 106d is coupled to local network 102 via recording device 108d. Local network 102b is coupled to communications network 100. Additionally coupled to communications network 100 is an application server 110a. As discussed above, the application server 110a can perform any of a plurality of operations. Additionally, while application server 110a is illustrated as being coupled to communications network 100, one or more application servers 216a can be configured to service specific portions of the overall network illustrated in FIG. 1. More specifically, one can conceive an application server coupled to local network 102a, as well as an application server coupled to local 210b. Other configurations can also be considered as part of this disclosure.

As discussed above, in many networking environments, a computing device is coupled, either directly or indirectly, to at least one communications device. While the exemplary embodiment of FIG. 1 illustrates two communications devices (106a and 106b) being coupled to one computing device 104a, this is a nonlimiting example, as other configurations can include one or more communications devices coupled to one or more computing devices. Similarly, while the computing devices 104 are illustrated as being separate from communications devices 106, this is a nonlimiting example. As one of ordinary skill in the art will understand, computing logic can be implemented in a communications device 106. Other configurations can include communications logic in the computing devices 104. Other configurations are also contemplated.

As illustrated in FIG. 1, recording devices 108a and 108b are coupled to communications devices 106a and 106b, respectively. Recording device 108c is coupled to local network 102b. In either configuration one or more recording device is implemented at a branch that is coupled to communications network 100. As discussed above, increased expense and network complexity can result from such a configuration.

One should also note that local networks 102a, 102b, 102c, and 102d (referred to collectively as local network 102) can include any of a plurality of different networks. More specifically, one or more network or network types can be implemented, including but not limited to a Local Area Network (LAN). Similarly, communications network 100 can include one or more different networks and/or types of networks. As a nonlimiting, example, communications network 100 can include a Wide Area Network (WAN), the Internet, and/or other network.

Figure 2:
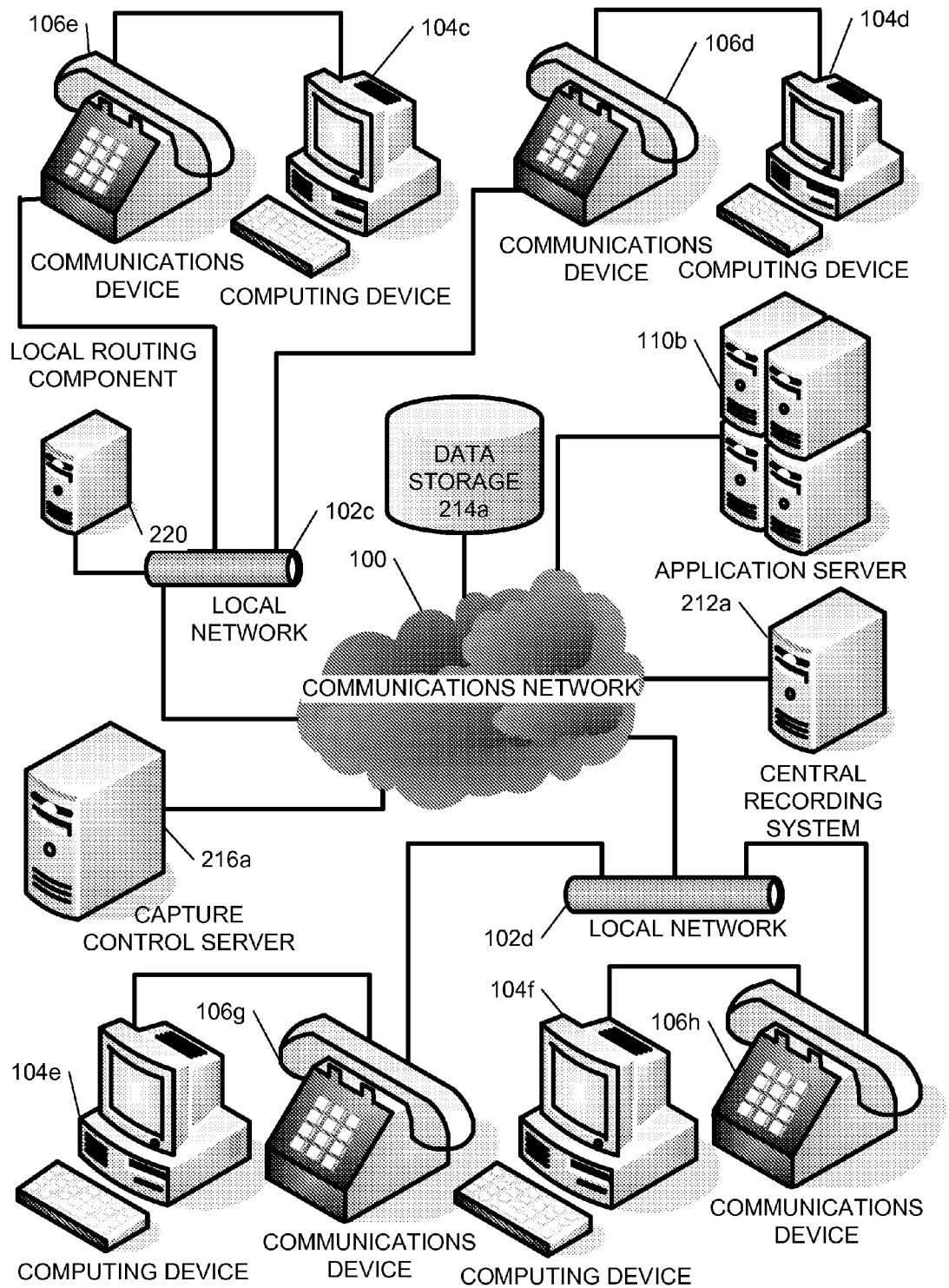
FIG. 2 is a functional diagram illustrating another exemplary configuration of a communications network with remotely located servers for overcoming deficiencies of the configuration from FIG. 1.

FIG. 2 is a functional diagram illustrating another exemplary configuration of a communications network with remotely located servers for overcoming deficiencies of the configuration from FIG. 1. In this exemplary embodiment, communications device 106e is coupled to computing device 104c, as well as to local network 102c. Similarly, communications device 106f is coupled to computing device 104d, as well as local network 102c. Similarly, communications device 106g is coupled to computing device 104e, as well as local network 102d. Communications device 106h is coupled to computing device 104f, as well as local network 102d.

Local network 102d is coupled to communications network 100. Similarly, local network 102c is coupled to communications network 100. Also coupled to communications network 100 are application server 110b, capture control server 216a, and data storage 214a. One should note that while data storage 214a, application server 110b, central recording system 212a, and capture control server 216a are coupled to communications network 100, these devices (and/or logic) can physically be located together at a remote site, or separately at a plurality of remote sites. Regardless of the physical location of this logic, the functionality associated with these components can be configured to serve one or more branch that is coupled to communications network 100. Additionally, while data storage 214a, application server 110b, central recording system 212a, and capture control server 216a are depicted as separate devices, this is also a nonlimiting example. In at least one embodiment, one or more of these may be combined. Similarly, the functionality of these devices may also be embodied through software, firmware, and/or hardware, depending on the configuration. As such, illustration of this functionality as devices is a nonlimiting example.

Additionally included in the nonlimiting example of FIG. 2 is a local routing component 220. Local routing component 220 can be configured to facilitate communications from communications device 106c and 106d when communications network 100 is unavailable. More specifically, if a connection between the communications network 100 and local network 102c is severed, the local routing component (which can operate using Survivable Remote Site Telephone (SRST) and/or other technologies) can be configured to facilitate communication of the communications data to the recorder and/or storage of the communications data. Such a configuration can facilitate a local protocol based recording, which can be implemented for a primary recording mechanism and/or to provide fail-over recording protection.

Figure 3:
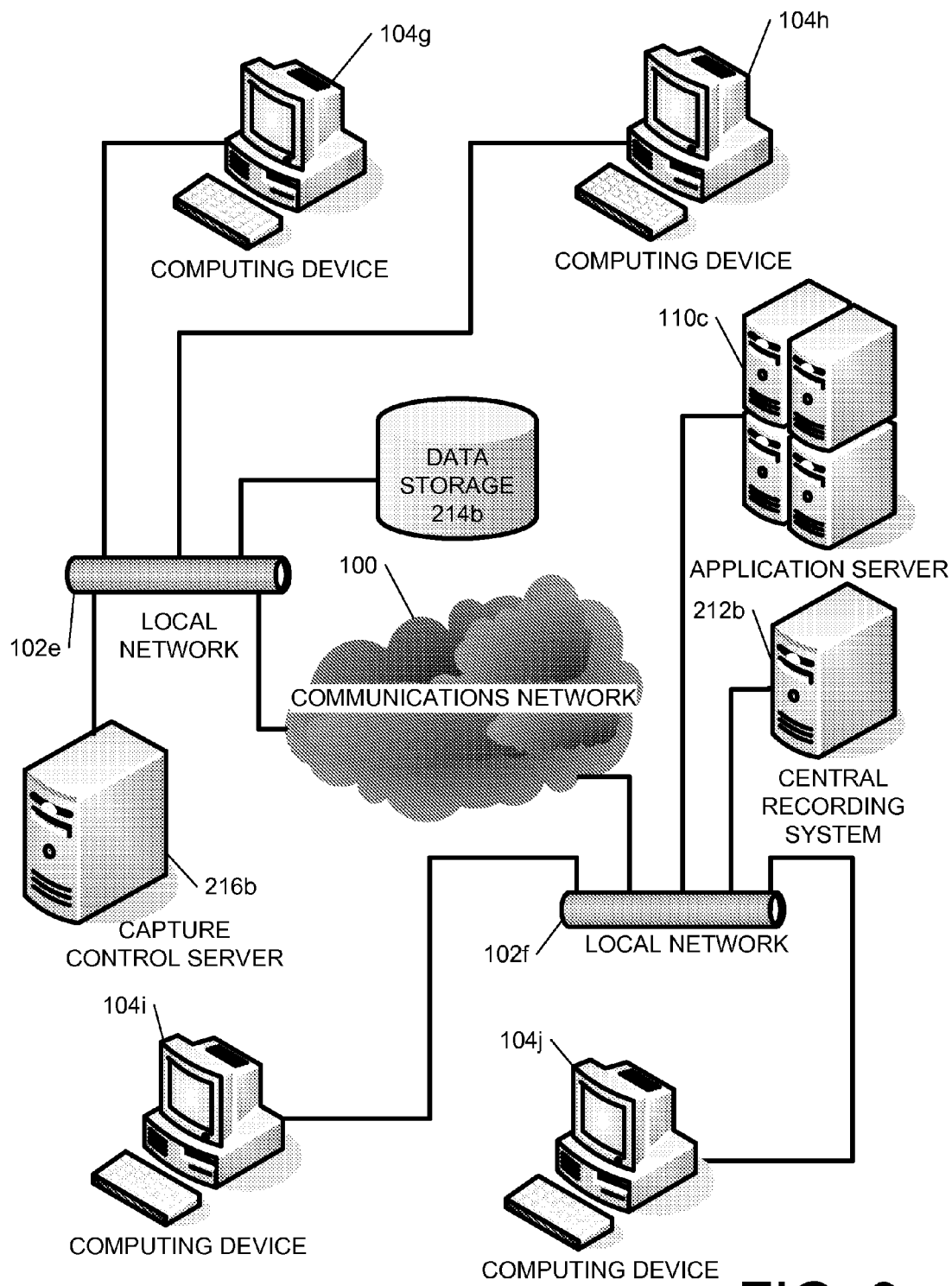
FIG. 3 is a functional diagram illustrating an exemplary communications network with local servers, similar to the configuration from FIG. 2.

FIG. 3 is a functional diagram illustrating an exemplary communications network with locally located servers, similar to the configuration from FIG. 2. More specifically, as illustrated in the nonlimiting example of FIG. 3, computing device 104g, which includes a softphone and therefore has the functionality of both a computing device and a communications device, is coupled to local network 102e. Also coupled to local network 102e is computing device 104h, which is also equipped with a softphone. Softphone enabled computing device 104i is coupled to local network 102f, as well as softphone enabled computing device 104j. Local networks 102e and 102f are coupled to communications network 100.

Also coupled to local network 102e is data storage 214b, as well as capture control server 216b. Coupled to local network 102f is central recording system 212b and application server 110c. More specifically, FIG. 3 illustrates that the functionality embodied in data storage 214b, capture control server 216b, application server 110c, and central recording system 212b can be coupled to the communications network 100 via a local network. These devices need not be remotely situated from any branch office and may be physically located at the same or different locations.

Figure 4:
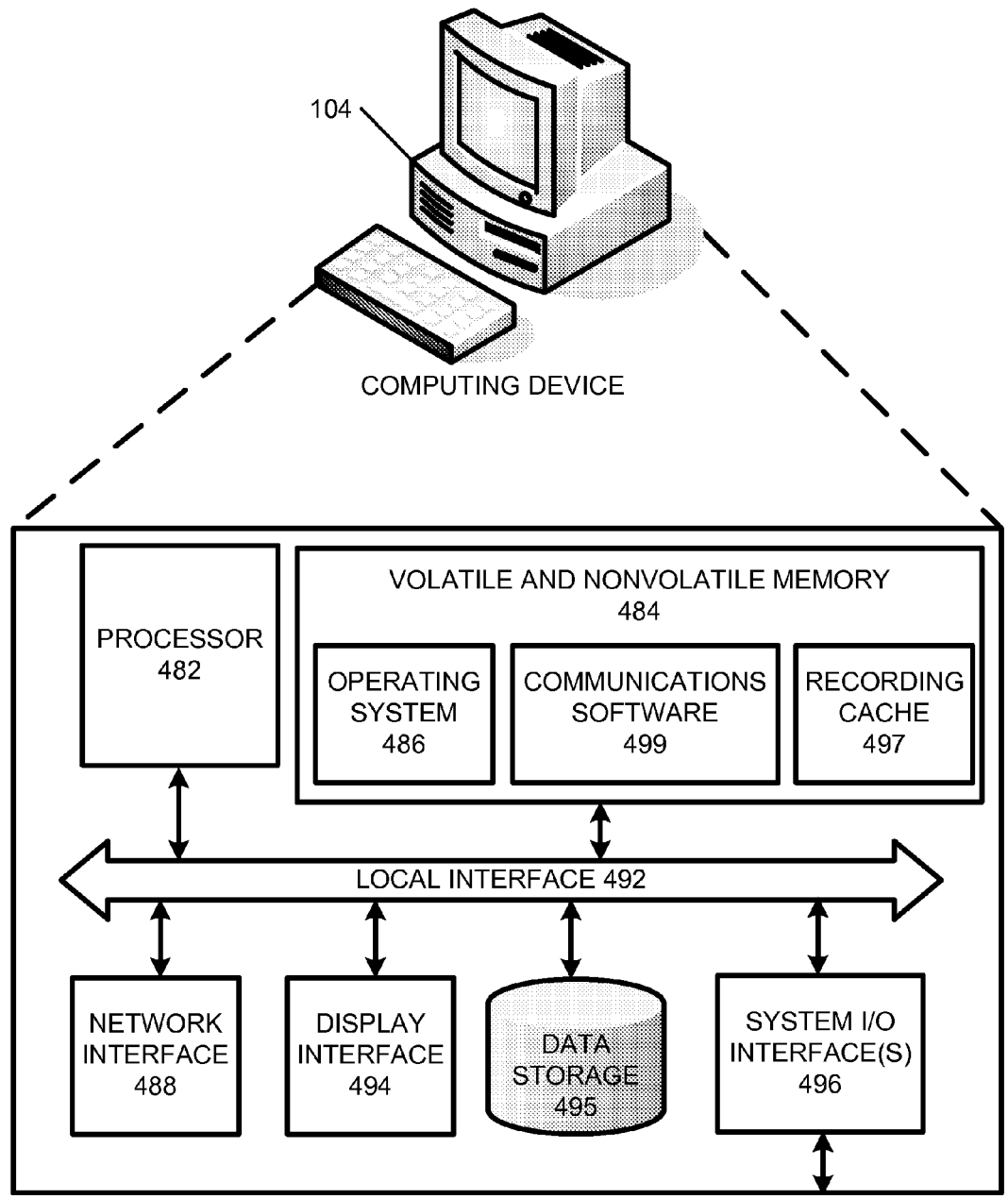
FIG. 4 is a schematic diagram illustrating an exemplary embodiment of a computing device that may be configured to communicate via a communications network such as the networks from FIGS. 1, 2, and 3.

FIG. 4 is a schematic diagram illustrating an exemplary embodiment of a computing device that may be configured to communicate via a communications network such as the networks from FIGS. 1, 2, and 3. Although a wire-line communications device is illustrated, this discussion can be applied to any device configured for receiving and/or sending data. As illustrated in FIG. 4, in terms of hardware architecture, the computing device 104 includes a processor 482, volatile and nonvolatile memory 484, a display interface 494, data storage 495, and one or more input and/or output (I/O) device interface(s) 496 that are communicatively coupled via a local interface 492. The local interface 492 can include, for example but not limited to, one or more buses and/or other wired or wireless connections. The local interface 492 may have additional elements, which are omitted for simplicity, such as controllers, buffers (caches), drivers, repeaters, and receivers to enable communications. Further, the local interface may include address, control, and/or data connections to enable appropriate communications among the aforementioned components. The processor 482 may be a hardware device for executing software, particularly software stored in volatile and nonvolatile memory 484.

The processor 482 can be any custom made or commercially available processor, a central processing unit (CPU), an auxiliary processor among several processors associated with the computing device 104, a semiconductor based microprocessor (in the form of a microchip or chip set), a macroprocessor, or generally any device for executing software instructions.

The volatile and nonvolatile memory 484 can include any one or combination of volatile memory elements (e.g., random access memory (RAM, such as DRAM, SRAM, SDRAM, VRAM, etc.)) and nonvolatile memory elements (e.g., ROM, hard drive, tape, CD-ROM, etc.). Moreover, the memory 484 may incorporate electronic, magnetic, optical, and/or other types of storage media. Note that the volatile and nonvolatile memory 484 can also have a distributed architecture, where various components are situated remotely from one another, but can be accessed by the processor 482.

The software in volatile and nonvolatile memory 484 may include one or more separate programs, each of which includes an ordered listing of executable instructions for implementing logical functions. In the example of FIG. 4, the software in the volatile and nonvolatile memory 484 may include communications client software 499, as well as an operating system 486, and a recording cache 497. Communications client software 499 can include a screen capture daemon, a capture control daemon, a voice capture daemon, recording logic, voice recognition logic, and/or other logic. In at least one embodiment, a daemon may include one or more pieces of logic that may be utilized for performing a function. While in some embodiments, a daemon may be utilized as an extension to another program, this is not a requirement. As a nonlimiting example, a daemon may include an operating system application, a hardware support application, a software support application, and/or other application, which may operate on UNIX, Windows, and/or other platforms. Additionally, while communications client software is illustrated in this nonlimiting example as a single piece of logic, as one of ordinary skill in the art will understand, communications logic 499 can include one or more separate software, hardware, or firmware modules. Additionally, recording cache 497 may be configured to receive and store one or more pieces of data accessed by computing device 104. The data may be part of a communication session, however this is not a requirement.

The operating system 486 may be configured to control the execution of other computer programs and may be configured to provide scheduling, input-output control, file and data management, memory management, and communication control and related services.

A system component embodied as software may also be construed as a source program, executable program (object code), script, or any other entity comprising a set of instructions to be performed. When constructed as a source program, the program is translated via a compiler, assembler, interpreter, or the like, which may or may not be included within the volatile and nonvolatile memory 484, so as to operate properly in connection with the Operating System 486.

The Input/Output devices that may be coupled to system I/O Interface(s) 496 may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc. Similarly, network interface 488, which is coupled to local interface 492 can be configured to communicate with a communications network, such as the network from FIGS. 2 and 3. While this communication may be facilitated via a communications device, such as communications device 106, this is not a requirement.

If the computing device 104 is a personal computer, workstation, or the like, the software in the volatile and nonvolatile memory 484 may further include a basic input output system (BIOS) (omitted for simplicity). The BIOS is a set of software routines that initialize and test hardware at startup, start the Operating System 486, and support the transfer of data among the hardware devices. The BIOS is stored in ROM so that the BIOS can be executed when the computing device 104 is activated.

When the computing device 104 is in operation, the processor 482 can be configured to execute software stored within the volatile and nonvolatile memory 484, to communicate data to and from the volatile and nonvolatile memory 484, and to generally control operations of the computing device 104 pursuant to the software. Software in memory, in whole or in part, is read by the processor 482, perhaps buffered within the processor 482, and then executed. Additionally, one should note that while the above description is directed to a computing device 104, other devices (such as application server 110, capture control server 216*a*, and central recording system 212*a*) can also include the components described in FIG. 4.

One should note that communications device 106 can be configured with one or more of the components and/or logic described above with respect to computing device 104. Additionally, communications device and/or computing device can include voice recognition logic, voice-to-text logic, text-to-voice logic, etc. (or any permutation thereof), as well as other components and/or logic for facilitating a communication. Additionally, in some exemplary embodiments, the communications device 106 can include the computing functionality described with respect to computing device 104. Similarly, in some exemplary embodiments, the computing device 104 can include the communications functionality described with respect to communications device 106. While reference to various components and/or logic is directed to the computing device 104 or the communications device 106, as one of ordinary skill in the art will understand, these are nonlimiting examples, as such functionality can be implemented on the computing device 104, the communications device 106, or both.

One should also note that in at least one nonlimiting example, the computing device 104 and communications device 106 are configured to act as independent devices, but, because the hub/switch can be physically located inside the communications device 106, the communications device 106 can be configured to control the packet flow and copy the associated Real Time Protocol (RTP) streams, so that the desired data can be seen on the computing device's network interface. As RTP streams are addressed to the communications device 106 (or the communications device's counterparty) the RTP streams can be ignored at the hardware level in the network interface 488. However, if the network interface 488 is configured to receive data in a promiscuous mode, the network interface 488 can be configured to "snoop" the RTP streams flowing to and from an adjacent communications device 106.

As indicated above, embodiments of the computing device 104 include a screen capture daemon. Screen capture of various data related to a communication can be implemented such that the application server 110*b* can contact the screen capture daemon and obtain screen frames associated with a communication. Similarly, for voice capture, many communications devices, such as IP telephones generally include a small switching hub and can be wired in between the local network infrastructure 102 and the computing device 104 proximate the communications device 106. Physically, the communications device 106 can include two RJ-45 (and/or other) connections. One connection may be connected via the building cabling back to the local network 102. The computing device 104 can be connected to the other connection via a short hook-up cable.

In operation, the screen capture daemon can be configured to capture data that is accessed by a user on computing device 104. More specifically, referring back to FIG. 3, in a communications session between computing device 104*g* and 104*j*, voice data, and/or other data may be communicated between the parties of the communication. The user of computing device 104*g* may desire that the user of computing device 104*j* view a picture, video, text file, audio file, and/or other data that may be distinct from the voice data communicated between the parties. As the users desire communication of this data, there also may be a desire to capture the data for recording purposes. To facilitate this desire, the screen capture daemon may be configured to capture screen data (which may include pictures, video files, audio files, text files, etc.) that is being sent to the other party (or parties) of the communication, and/or otherwise associated with one of the parties.

Additionally, depending on the particular configuration, the screen capture daemon can be configured to capture data that is sent to a recipient, as well as data that is simply being displayed during a communications session. Similarly, the screen capture daemon can be configured to capture data that is distinct from a communications session all together.

A voice capture daemon can also reside and execute on computing device 104. The voice capture daemon may be under control of the application server 110, and may be configured to start and stop RTP packet capture. The voice capture daemon can detect and isolate RTP streams, such as: one directed towards the communications device 106 and one directed away from the communications device 106. Where the communications session is handled locally, the audio data can be encoded in G.711 protocol, but other protocols can also be utilized, such as, but not limited to the more heavily compressed G.729A protocol (often used when calls traverse communications network 100).

Referring to capture control, the application server 110 is configured to communicate with a capture control process over a TCP/IP connection. The capture control process (which can run on the application server 110 and/or a capture control server 216*a*) announces itself to the application server 110, which can then request a desired number of record and replay ports according to settings in a data file associated with the application server 110. Even though in some embodiments there is generally no concept of "record" ports, the capture control process can accept requests for an arbitrary number of record ports and the application server 110 can reply with the number of replay ports requested. If telephone replay is supported, the capture control process can then attempt to instantiate that number of communications devices 106 for replay.

The action commands that flow from the application server 110 to the capture control process can include Service Observe ON/OFF commands that specify the station, and Capture ON/OFF commands that specify a filename exposed by the application server 110. Similarly, other commands for dialing and playing back recordings can be sent from application server 110 to the capture control process.

On receipt of a service observe command, the capture control process can look up the IP address of the desired computing device 104 from a station number supplied in a lookup table that is already being maintained for screen capture. The capture control process can then arm the voice capture daemon on the computing device 104. When the capture control process receives a capture control command, the capture control process can instruct the capture control daemon to begin assembling RTP packets into audio streams.

While any encoding protocol can be used, if an RTP codec is in use under G.729A protocol, the capture control daemon can assemble, for example, 2 kilobits of audio data each second, after the capture control daemon has removed the RTP headers. The capture control daemon can repair the RTP stream in real time by removing duplicate packets, reversing out of order packets and filling any gaps with G.729A "silence." The capture control daemon can assemble a stereo pair of files; one file for transmit, and one file for receive.

If the audio is received in a G.711 protocol, the data can optionally be compressed locally at the computing device 104 to conform with the G.726 protocol and mixed into a single stream so as to reduce its bandwidth from 2-by-64 kilobits per second (kbps) to 16 kbps. In general, any audio input format can be supported with a user-configurable determination of the format for conversion to and whether or not the data should be mixed into a single stream or kept as two independent streams. One should note that while the above description refers to G.729A protocol, G.711 protocol, and G.726 protocol, any encoding protocol can be used.

One should also note that any of a plurality of different encryption techniques may be used to encrypt data between a computing device 104 (and/or communications device 106) and a network (see FIGS. 1, 2, 3), as well as encrypt data locally within computing device 104 (and/or communications device 106). As a nonlimiting example, communications between the recorder and the daemons associated with a communications device 106 can be configured for encryption and decryption to provide a more secure network environment.

The capture control daemon can be configured to transfer the captured audio to the capture control process, for further processing. The RTP streams captured by the capture control daemon can be disjoint. Additionally, the application server 110 can operate in a "timed" mode and ask for capture when no call is in progress. At other times, the application server 110 can put calls on hold. The capture control daemon can use a 250 millisecond (ms), or other gap in RTP to indicate breaks between calls. Each of these call segments can be given an incrementing segment number.

Uploading can be accomplished in any of a plurality of ways. As a nonlimiting example, uploading can occur during a call segment, at the end of a call segment, at the end of recording, etc. (or any permutation). The first option of near-real-time optimizes the network traffic (by sending blocks of audio, stripped of the onerous RTP headers, over elastic, reliable TCP/IP pipes) without requiring the capture control daemon to maintain temporary files on the hard disk of the computing device 104. The capture control daemon can use Hypertext Transfer Protocol (HTTP), Server Message Block (SMB), a proprietary Transmission Control Protocol/Internet Protocol (TCP/IP) based protocol, or other protocol (or any permutation therein) to complete the transfer. The choice of protocol can depend on the choice of upload timing.

After receiving a complete stereo pair, the capture control process can copy a complete stereo pair to the portion of file share exposed by the application server 110. Before the capture control process can process the complete stereo pair, the capture control process converts the audio to a single mono audio file (such as a wav file or other audio file). The capture control process can then convert this data by decompressing the two halves from the G.729A (or other) protocol to a linear format, summing the two halves, and then converting the mixed signal back to the G.711 mu-law protocol (or G.711 A-law, or other protocol, depending on the particular configuration). This operation can be CPU intensive, so some embodiments include facilitating at least one daemon to process this data in a distributed fashion. Such an implementation could, however, lead to a four-fold increase in the amount of audio data copied from the daemon to the central server(s). In the more common case, however, where the audio is received in the G.711 mu-law protocol, the local workstation can mix and compress the data before transmission. Additionally, the capture control process can run co-resident with the application server 110, but when collecting data predominantly in the G.729A protocol, the decompression and mixing load that can be imposed on the capture control process mean that the capture control process can run on a separate server in many environments.

Instead of transmitting data during the communication, the recording of audio and/or screen data can be buffered in recording cache 497 of volatile and nonvolatile memory 484 (on data storage 495, or otherwise stored and/or accessible to the computing device 104). Additionally, transmission of the recorded audio and/or screen content from computing device 104 back to a central recording system can then be scheduled to occur at quiet periods (e.g., overnight or other times of reduced network traffic). Additional processing of the data may be completed by the computing device 104 prior to and/or after transmission of the data. When used for speech recognition, the computing device 104 may tune its speech analysis algorithms to those speakers from whom the computing device 104 normally received voice data.

Additionally, for increased efficiency of data transfer, the audio and screen data may be combined over a single connection. Since screen data and/or audio data can be recorded at the computing device 104 (either together or independently), the system clock associated with the computing device 104 can be used to timestamp audio packets and on-screen changes such that the precise relationship between these is known. Other embodiments can facilitate capture of the screen data separately from the audio data. More specifically, in at least one embodiment, screen data can be captured by a first computing device 104, while the audio data is captured by a second computing device 104 (or not captured at all).

Other embodiments can combine commands to start and stop screen and audio recording, thereby giving more efficient, simpler and more synchronized control over the recording. Similarly, the deployment of screen and audio recording components on the computing device 104 can be combined into a single installation package such that deploying the audio recording component provides negligible additional overhead if screen capture is being deployed. If screen and/or audio data is buffered (via a rolling buffer or otherwise) at the workstation, 100% recording can be turned on at the computing device 104 with minimal realized impact on the bandwidth or load on the rest of the overall network.

The central processing system 320 can then instruct the computing device 104 to delete or forward each recording at a later time. This option allows the system to make decisions based on factors that could not be known at the start of the call, such as call duration and call outcome. Although described herein as operating under the control of a centralized quality management system with connection to a central Computer Telephony Integration (CTI) feed, the system can also be deployed with local call detection. By interpreting call setup and control information passing to and from the communications device 106, a computing device 104 can apply local rules or record some or all calls and annotate these recordings with details gleaned from the communications device 106 (e.g., ANI, agent ID as well as others). These details can then be passed back to the central recording system along with the audio content.

For added security of recordings, in at least one exemplary embodiment, computing devices 206 may copy recording content to other computing devices 206 so as to provide fallback storage in the event of failure of the computing device 104 or its hard disk or attempts to tamper with the recordings.

To detect tampering and failure of the recording components, embodiments of the central recording system 212 may "heartbeat" the software on one or more computing device 104 on a regular basis to confirm that a particular computing device 104 is still operational and has not failed or been disabled. To ensure that unauthorized parties do not take control of the computing device 104 by "spoofing" the quality system, the computing device 104 may be configured with security devices such as a public key encoding system (not shown) so that only the authorized server can communicate with the computing device 104. The computing device 104 may also alert the user should the IP address of the quality server controlling the computing device 104 change. This alert can give the user an option to accept or reject this new connection.

In at least one exemplary embodiment, computing devices 104 can be configured to transmit recordings to multiple destinations if requested and/or central equipment can be configured to copy from one system to another if bandwidth between the central hubs is more readily available than between remote sites and hubs.

The embodiments disclosed herein can be implemented in hardware, software, firmware, or a combination thereof. At least one embodiment, disclosed herein is implemented in software and/or firmware that is stored in a memory and that is executed by a suitable instruction execution system. If implemented in hardware, as in an alternative embodiment embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. Additional description of one or more components of this disclosure may also be found in U.S. application Ser. No. 11/394,408, filed Mar. 31, 2006, which is incorporated by reference in its entirety, as well as "Contact-Store for Call Manager," which is also incorporated by reference in its entirety, as well as U.S. patent application entitled "Distributive Data Capture" accorded Ser. No. 11/540,171, which is also hereby incorporated by reference in its entirety.

Figure 5:
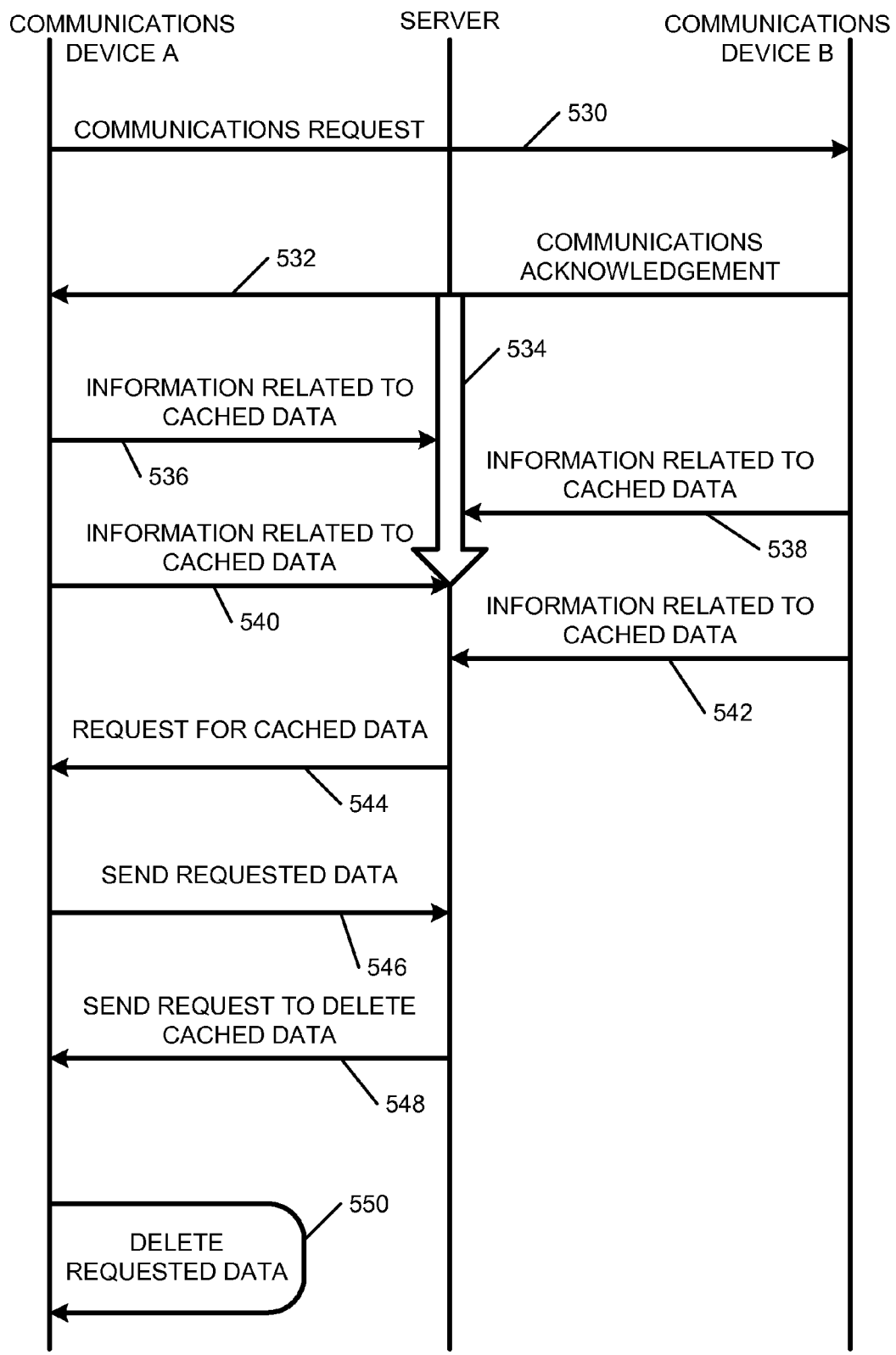
FIG. 5 is a flowchart illustrating exemplary actions that can be performed in providing distributed network control in a recording environment, such as a network from FIG. 3.

FIG. 5 is a flowchart illustrating exemplary actions that can be performed in providing distributed network control in a recording environment, such as a network from FIG. 3. More specifically, as illustrated in the nonlimiting example of FIG. 5, communications device A (e.g., communications device 104 and/or computing device 106) can send a communications request to communications device B (arrow 530). This request can come in the form of a user dialing a telephone number (and/or other address) related to communications device B, however this is not a requirement. Upon receiving the communications request, communications device B can send a communications acknowledgement to communications device A (arrow 532). The acknowledgement can include a user at communications device B answering the call and/or other acknowledgement. One should note that while the communications requests (arrows 530 and 532) are illustrated as being direct communications between the communications devices, this is a nonlimiting example. More specifically, depending on the particular configuration, the communications request and/or acknowledgement may be transmitted via a network to a server, switch, hub, and/or other network component prior to reaching the destination. Once the communications acknowledgement is received, the communications session can begin, as illustrated with arrow 534.

Additionally, as discussed above, once a communications session has begun, the voice capture daemon, screen capture daemon, and/or other components may capture data related to the communications session. The captured data can be stored in a local cache related to the communications device(s) involved with the communications session. While in some configurations, each communications device can independently record data related to the communications session, this is not a requirement. As discussed in more detail below, other configurations can permit the server (e.g., application server 110, central recording system 212, data storage 214, and/or other components) to determine the devices that will capture various aspects of a communications session.

Referring back to FIG. 5, at various times (before, during, and/or after a communications session) communications device A may send an indication regarding data stored in local cache (arrows 536, 540). Similarly, communications device B may send an indication regarding data stored in the local cache related to communications device B (arrow 538). The received data can include data related to a particular communications session, and/or to the entire collection data stored in local cache. More specifically, depending on the particular configuration, the data sent to the server can include size of a particular recording, current capacity of local cache, types of data stored in cache, amount of time stored, etc.

Upon receiving the information related to cached data, the server may determine to remotely store at least a portion of the locally cached data such as, for example, at data storage 214. In such a scenario, the server can send a request to communications device A for the desired data. As a nonlimiting example, if the server determines that data related to a particular communication is more efficiently stored remotely on the network (or current bandwidth usage permits transmission), the server may send a request. Similarly, some configurations may determine that a local cache related to communications device A is close to capacity and request that data stored in the local cache be sent to the server as a rolling buffer. More specifically, as new information is stored on local cache of communications device A, the earliest stored data can be sent to the server. Other configurations are also considered.

Upon receiving the request for data, communications device A can send the requested data (arrow 546). The server may then make a determination as to whether to continue to store this data on local cache of communications device A. If the server determines to continue to store this data locally, the server can send a request to delete the locally cached data (arrow 548). Communications device A can then delete the requested data (arrow 550).

Figure 6:
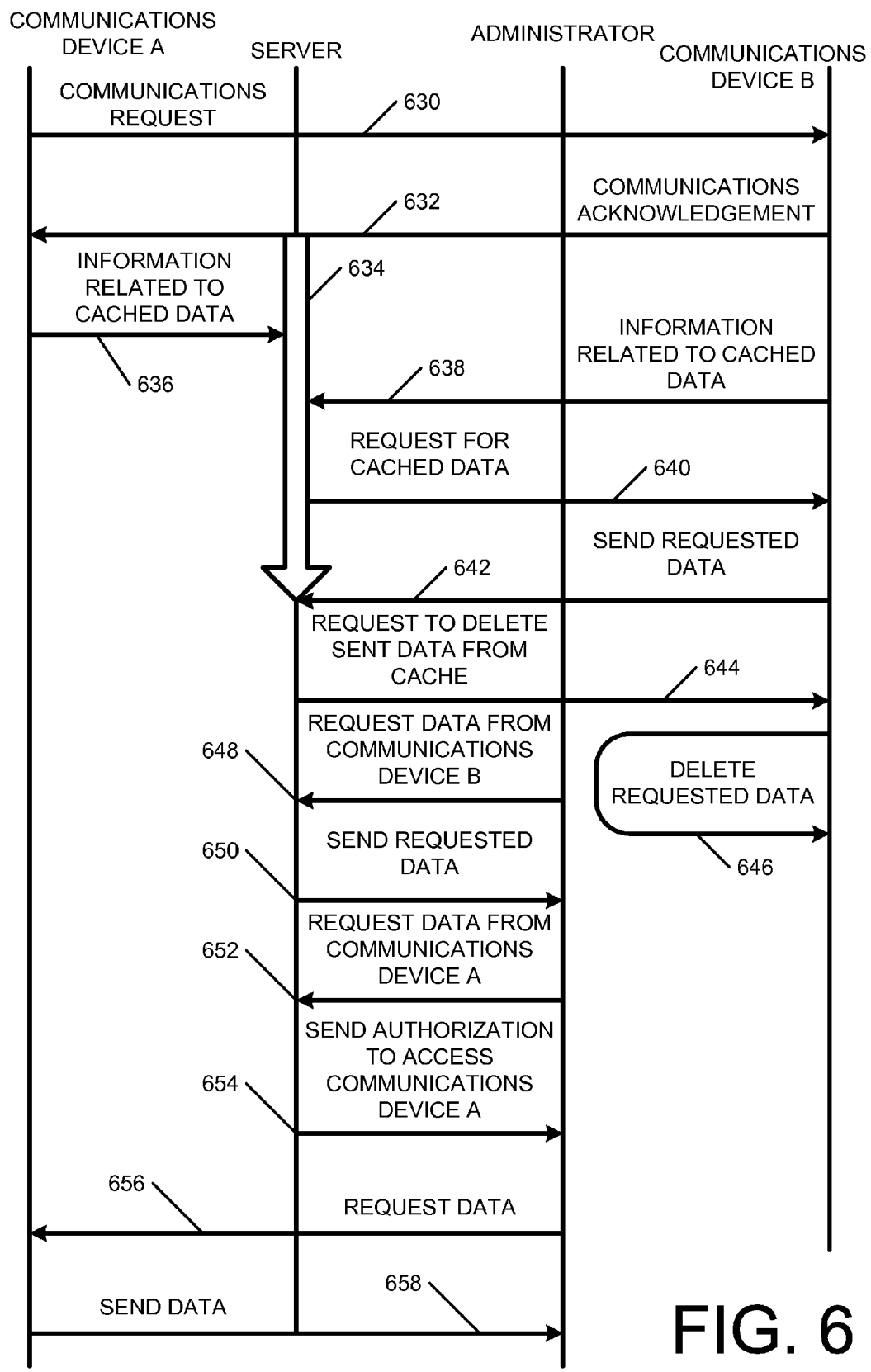
FIG. 6 is a flowchart illustrating exemplary actions that can be performed in providing access to an administrator, similar to the flowchart from FIG. 5.

FIG. 6 is a flowchart illustrating exemplary actions that can be performed in providing access to an administrator, similar to the flowchart from FIG. 5. More specifically, as illustrated in the nonlimiting example of FIG. 6, communications device A (e.g., communications device 104 and/or computing device 106) can send a communications request to communications device B (arrow 630). Upon receiving the communications request, communications device B can send a communications acknowledgement to communications device A (arrow 632). Once the communications acknowledgement (arrow 632) is received, the communications session may begin (arrow 634). The communications session can continue until one or more of the parties (or other entity) severs the connection.

As illustrated in FIG. 6, during the communications session, a screen capture daemon and/or voice capture daemon may be capturing data related to the communications session. Additionally, at least a portion of the captured data can be cached locally at communications device A. While the cached data can be sent to a server (e.g., application server 110, central recording system 212, data storage 214, etc.) at a predetermined time, this is not a requirement. More specifically, in at least one nonlimiting example, communications device A can send information related to the cached data (arrow 636) at any of a plurality of different times, before, during, and/or after a communications session begins. Additionally, the data being sent can include any of a plurality of information including size of the most recent recording, address of the communications devices involved, current size of data stored in cache, etc. Similarly, communications device B can send similar information to the server, as illustrated with arrow 638.

As the server can be configured to monitor network bandwidth usage, as well as data related to the local caches of a plurality communications devices, when the server determines that data can be sent to the server for storage, the server can send a request for at least a portion of the locally cached data from one or more communications devices (arrow 640). The request can include simply an indication to send the locally cached data based on a rolling buffer configuration (e.g., as the cache fills up, the data stored longest will be sent to the server), however this is not a requirement. In at least one nonlimiting example, the server, with knowledge of data stored on communications device B, can send a request for a specific portion of the locally cached data. Upon receiving the request, communications device B can send the requested data (arrow 642).

Upon receiving the requested data, the server can determine whether there is a desire for communications device B to maintain the data in the local cache of communications device B. As discussed above, a rolling buffer configuration can be utilized, where data is maintained in cache until the cache reaches capacity, at which point, the data stored for the longest amount of time can be deleted to make room for newly received data. Additionally, some configurations can be utilized in which the server makes a decision to delete the received data from local cache based on current capacity of the cache, potential local needs of the data, and/or other criteria. If the server determines that the data can be deleted from cache, the server can send a request to delete the data (arrow 644) and communications device B can delete the requested data (arrow 646).

Additionally, an administrator (or other entity) may desire to view certain data related to a communications device an/or communications session (e.g., communications device B). In such a scenario, the administrator can send a request to the server for data related to the communications device and/or communications session (arrow 648). While in some configurations, the server can simply forward the requested data, in at least one embodiment, the server can determine whether the requested data is stored by the server, whether the requested data is stored in a local cache of a communications device, etc. From these determinations the server can determine the most desirable technique for the administrator to access the requested data.

As a nonlimiting example, as shown with arrow 648, the administrator can request data related to communications device B. The server, in this scenario has stored the data from communications device B and instructed communications device B to remove the data from local cache. As such, the server may determine that the most desirable option is to send the requested data from the server to the administrator (arrow 650).

Similarly, the administrator can request data related to communications device A. As the server has not requested (or deleted) data from the local cache of communications device A, the server may determine that the most desirable scenario is for the administrator to access the requested data directly from communications device A. The server can then instruct the administrator to contact communications device A directly and/or send authorization to access the data stored on local cache of communications device A (arrow 654). The administrator can then request the data from communications device A (arrow 656). Communications device can then send the requested data to the administrator.

One should note that while FIGS. 5 and 6 discuss scenarios of scheduling, these are nonlimiting examples. More specifically, some embodiments can facilitate uploading of data can be scheduled per clients residing in a specific location, some embodiments may facilitate scheduling on each communication device. Additionally, in at least one embodiment, recording data can include dividing uploading data from the client device to a remote location based on sensitivity of the data an/or application utilizing the data. More specifically, if data is determined to be more sensitive, the data may be scheduled to send immediately, less sensitive data can be cached locally and uploaded at a later time. Additionally, in at least one embodiment, data may be uploaded to a remote location from cache of a communications device and/or computing device.

One should also note that while the flowcharts of FIGS. 5 and 6 are directed to control of previously stored data, these are nonlimiting examples. More specifically, depending on the particular configuration, the server (which, in practice, may include one or more network components) may be configured to provide control over the recording of communications on the network. The server can be configured to allocate recording tasks to one or more communications devices 104 (and/or computing devices 106) based on desired criteria. More specifically, current network bandwidth may be a consideration, as well the type of recording desired. While some networks may request total recording, other networks may impose post-processing rules. More specifically, some networks may only desire recording of communications sessions that are longer than a predetermined duration. Still some networks may only desire recording of communications sessions that occur during business hours. As such, the server can allocate recording tasks accordingly. Similarly, the server can dynamically grant and/or restrict bandwidth usage to one or more network components based on predetermined criteria.

The embodiments disclosed herein can be implemented in hardware, software, firmware, or a combination thereof. At least one embodiment, disclosed herein is implemented in software and/or firmware that is stored in a memory and that is executed by a suitable instruction execution system. If implemented in hardware, as in an alternative embodiment embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

One should note that the flowcharts included herein show the architecture, functionality, and operation of a possible implementation of software. In this regard, each arrow can be interpreted to represent a module, segment, or portion of code, which comprises one or more executable instructions for implementing the specified logical function(s). It should also be noted that in some alternative implementations, the functions noted in the arrows may occur out of the order and/or not at all. For example, two arrows shown in succession may in fact be executed substantially concurrently or the arrows may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non-exhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

One should also note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiments without departing substantially from the spirit and principles of the disclosure. All such modifications and variations are intended to be included herein within the scope of this disclosure.

Therefore, at least the following is claimed:

1. A method for distributive network control, comprising:
   receiving an indication related to recording data stored on a local cache at a computing device, the recording data being stored by a capture daemon during a communication session;
   determining, based on the received indication, whether to remotely store at least a portion of the data in accordance with a first condition of the local cache in the indication;
   in response to determining to remotely store at least a portion of the data, sending a request to the computing device for the stored data in accordance with a second condition of a network over which the at least a portion of the data is to be communicated; and
   receiving the requested data.

2. The method of claim 1, wherein the recording data is related to a Voice over Internet Protocol (VoIP) communication and wherein the recording data includes voice data and screen data.

3. The method of claim 1, further comprising utilizing a system clock to time stamp at least a portion of the data.

4. The method of claim 1, further comprising remotely storing the received data.

5. The method of claim 1, further comprising determining whether to facilitate deletion of the stored data from the local cache.

6. The method of claim 1, further comprising, in response to determining to facilitate deletion of the stored data, sending a request to delete the stored data from the local cache.

7. The method of claim 1, further comprising combining audio data and screen data over a single connection.

8. The method of claim 1, wherein at least a portion of the data is buffered in a rolling buffer at the local cache.

9. The method of claim 1, further comprising:
   receiving a request for at least a portion of the data;
   determining whether the data is stored at a local cache; and
   in response to determining that the data is stored at a local cache, sending an indication to access the data from the local cache.

10. The method of claim 9, wherein the indication to access the data from the local cache includes providing authorization to access the local cache.

11. The method of claim 1, wherein at least one recording setting is adjusted at the computing device.

12. A computer readable medium for distributive network control, comprising:
    first receiving logic configured to receive an indication related to recording data stored on a local cache, the recording data being stored by a capture daemon during a communication session;
    first determining logic configured to determine, based on the received indication, whether to remotely store at least a portion of the data in accordance with a first condition of the local cache in the indication; and
    sending logic configured to, in response to determining to remotely store at least a portion of the data, send a request for the stored data in accordance with a second condition of a network over which the at least a portion of the data is to be communicated,
    wherein at least a portion of the data is buffered in a rolling buffer at the local cache.

13. The computer readable medium of claim 12, further comprising second receiving logic configured to receive the requested data.

14. The computer readable medium of claim 13, further comprising storing logic configured to remotely store the received data.

15. The computer readable medium of claim 12, further comprising second determining logic configured to determine whether to facilitate deletion of the stored data from the local cache.

16. The computer readable medium of claim 12, further comprising:
    third receiving logic configured to receive a request for at least a portion of the data;
    third determining logic configured to determine whether the data is stored at a local cache; and
    access logic configured to, in response to determining that the data is stored at a local cache, send an indication to access the data from the local cache.

17. The computer readable medium of claim 16, wherein the access logic is further configured to provide authorization to access the local cache.

18. A system for distributive network control, comprising:
a first receiving component configured to receive an indication related to recording data stored on a local cache, the recording data being stored by a capture daemon during a communication session;
a first determining component configured to determine, based on the received indication, whether to remotely store at least a portion of the data in accordance with a first condition of the local cache in the indication;
a sending component configured to, in response to determining to remotely store at least a portion of the data, send a request for the stored data in accordance with a second condition of a network over which the at least a portion of the data is to be communicated; and
a second determining component configured to determine whether the data is stored at a local cache.

19. The system of claim 18, further comprising a second receiving component configured to receive a request for at least a portion of the data.

20. The system of claim 19, wherein the first receiving component includes a remotely located server.

21. The system of claim 19, further comprising a deletion component configured to, in response to a determination to facilitate deletion of the stored data, send a request to delete the stored data from the local cache.

22. The system of claim 18, further comprising, a third determining component configured to determine whether to facilitate deletion of the stored data from the local cache.

23. The system of claim 18, further comprising means for sending, in response to determining that the data is stored at a local cache, an indication to access the data from the local cache.

* * * * *